Patented Feb. 11, 1936

2,030,709

UNITED STATES PATENT OFFICE 2,030,709

COATING COMPOSITION AND METHOD OF APPLYING

Lewis Edgar Munz, Muskegon, Mich., assignor of one-half to E. H. Sheldon & Company, Muskegon, Mich.

No Drawing. Application February 9, 1933, Serial No. 656,027

23 Claims. (Cl. 134—26)

This invention relates to an improved coating composition and to the coating itself.

The objects of the invention are:

First, to improve the utilization of cashew nut shell oil and compositions containing such cashew nut shell oil in such a coating.

Second, to provide in connection with such cashew nut shell oil and cashew nut shell oil compounds improved hardening and drying means.

Third, to provide in such a compound and coating an improved adhesive or binder to insure the adhesion of such coating.

Fourth, to provide in such cashew nut shell oil and cashew nut shell oil compound an improved resistance to organic solvents, generally and particularly such as coal tar solvents, benzene, homologues, and their derivatives, and other solvents, such as chloroform, ether and their derivatives.

Further objects pertaining to details of composition and of the process will appear from the description to follow.

In carrying out my invention I utilize the inventions as described by Mortimer T. Harvey, of East Orange, New Jersey, as described in his United States Letters Patent Nos. 1,725,791 to 1,725,797 inclusive, issued August 27, 1929, and No. 1,821,095, issued September 1, 1931, which material said Harvey has placed on the market under the name "Harvel". For the drying and hardening means I make use of synthetic drying oil as described in United States Letters Patent to Arnold M. Collins, No. 1,812,849, issued June 30, 1931, which has been placed on the market by the Du Pont Company under the name of "S. D. O." Neither of these substances by itself is complete and effective in accomplishing a coating comparable with that which I produce.

I preferably apply my improved coating material with a spray gun. I admix with a mixture these coating compounds "S. D. O." and "Harvel". To insure adhesion I use a synthetic resin sold under the name of "Styrol" (namely, phenylethylene or cinnamene or vinylbenzene $C_6H_5CHCH_2$). Other synthetic resins are available in this behalf and should be used in proportion according to their quality. The material can be caused to adhere by natural resin varnish or by copal varnish or other adhesives of varnish-like character.

In applying my coating to metal, I admix five parts of "Harvel" or cashew nut preparation with three parts of the "S. D. O." preparation, to which I add three parts of the synthetic resin referred to. Three parts of adhesive is relative, as in some instances a lesser amount may serve the purpose. For some uses, as on wood or porous material of any kind, no adhesive is needed.

The synthetic resin and the "S. D. O." are mixed and dissolved in a suitable solvent which is preferably a coal tar solvent, such as homologues of benzene or their derivatives. The method may be varied. The synthetic resins may be cooked or admixed with cashew nut shell oil treated with formaldehyde and then admixed with "S. D. O."

This material is sprayed upon metal to be coated. It adheres thereto and is placed in a suitable oven to dry and harden at a temperature of about 120° F. for sufficient time to thoroughly dry and harden the coating, the usual time required being about ten hours, a longer time doing no harm. A higher temperature would hasten the result. The drying may be accomplished at a lower temperature but so long a time would ordinarily be required that it would not be practical for manufacturing purposes. If too high a temperature is used, the result is not so good.

Ordinarily a minimum of three coats is applied although a larger number or less number can be applied with corresponding result. Where extreme hardness is required in the final coat, the cashew nut shell oil or "Harvel" is reduced to three parts and the "S. D. O." increased to five parts. It would be possible on the outer coat to omit the synthetic resin, but as the successive coats have some effect on each other, it is really best to use the synthetic resin in the outer coats as well. By making use of the synthetic resin in all coats, any tendency for the coats to separate is completely obviated and homogeneous layers are secured.

When it is desired to coat wood, concrete, or any material having a sufficiently porous or rough surface so that an adhesive is not necessary, I use the same proportions of ingredients, omitting the synthetic resin. Synthetic resin or other adhesive is required only for smooth surfaces such as smooth or polished metal or the like.

The proportions that I have given have been found in practice to be very effective. Coating produced on wood resists water, moisture, concentrated acids, alkalies, and organic solvents of all natures. It is not damaged by a considerable application of heat up to 500° F. for a limited period as ordinarily used for laboratory tables and the like. A burning match dropped on the table does no harm. A continued application of heat sufficiently high to affect the wood through the layer might damage the same. Only a thin layer, like a layer of varnish, is applied.

I desire to claim the specific structure and also to claim the invention broadly, as pointed out in the appended claims.

Having thus described my invention, what I claim as new and desire to secure by Letters Patent is:

1. A coating composition comprising cooked cashew nut shell oil treated with formaldehyde, admixed with synthetic drying oil comprising a polymerization product of divinyl-acetylene, and admixed with a synthetic resin varnish to supply adhesive quality.

2. A coating composition comprising cooked cashew nut shell oil treated with an aldehyde, admixed with synthetic drying oil comprising a polymerization product of divinyl-acetylene, and admixed with a synthetic resin varnish to supply adhesive quality.

3. A coating composition comprising cooked cashew nut shell oil, admixed with synthetic drying oil comprising a polymerization product of divinyl-acetylene, and admixed with a synthetic resin varnish to supply adhesive quality.

4. A coating composition comprising cooked cashew nut shell oil, admixed with synthetic drying oil comprising a polymerization product of divinyl-acetylene, and admixed with a varnish to supply adhesive quality.

5. An article of manufacture having thereon a coating comprising layers of cooked cashew nut shell oil treated with formaldehyde, synthetic drying oil comprising a polymerization product of divinyl-acetylene, and a synthetic resin varnish to supply adhesive quality.

6. An article of manufacture having thereon a coating comprising layers of cooked cashew nut shell oil treated with an aldehyde, synthetic drying oil comprising a polymerization product of divinyl-acetylene, and a synthetic resin varnish to supply adhesive quality.

7. An article of manufacture having thereon a coating comprising layers of cooked cashew nut shell oil, synthetic drying oil comprising a polymerization product of divinyl-acetylene, and a synthetic resin varnish to supply adhesive quality.

8. An article of manufacture having thereon a coating comprising layers of cooked cashew nut shell oil, synthetic drying oil comprising a polymerization product of divinyl-acetylene, and a varnish to supply adhesive quality.

9. A coating composition comprising cooked cashew nut shell oil treated with formaldehyde and a varnish, and then admixed with synthetic drying oil comprising a polymerization product of divinyl-acetylene.

10. A coating composition containing a mixture of cooked cashew nut shell oil treated with an aldehyde, and then admixed with a polymerization product of divinyl-acetylene.

11. The process of applying a coating consisting in spraying successive coatings of cashew nut shell oil treated with formaldehyde, and admixed with synthetic drying oil comprising a polymerization product of divinyl-acetylene admixed with a synthetic resin, and heating the successive coatings to about 125° F. for sufficient time to insure hardening of the said material.

12. A coating composition comprising cooked cashew nut shell oil treated with a formaldehyde admixed with a synthetic drying oil comprising a polymerization product of divinyl acetylene.

13. A coating composition comprising cooked cashew nut shell oil admixed with synthetic drying oil comprising a polymerization product of divinyl acetylene.

14. A coating composition comprising five parts of cooked cashew nut shell oil treated with formaldehyde, admixed with substantially three parts of a synthetic drying oil comprising a polymerization product of divinyl acetylene and admixed with a varnish resin to supply adhesive quality.

15. A coating composition comprising five parts of cooked cashew nut shell oil treated with aldehyde admixed with substantially three parts of a synthetic drying oil comprising a polymerization product of divinyl acetylene and admixed with a varnish resin to supply adhesive quality.

16. A coating composition comprising five parts of cooked cashew nut shell oil admixed with substantially three parts of synthetic drying oil comprising a polymerization product of divinyl acetylene and admixed with a varnish resin to supply adhesive quality.

17. A coating composition comprising five parts of cooked cashew nut shell oil treated with formaldehyde and admixed with three parts of a synthetic drying oil comprising a polymerization product of divinyl acetylene.

18. A coating comprising five parts of cooked cashew nut shell oil admixed with three parts of a synthetic drying oil comprising a polymerization product of divinyl acetylene.

19. A coating composition comprising cooked cashew nut shell oil treated with formaldehyde admixed with a synthetic drying oil comprising a polymerization product of divinyl acetylene and admixed with a varnish resin to supply adhesive quality, said cashew nut shell oil compound and said synthetic drying oil being combined in such proportion that a dried coating of the composition is more resistant to solvents than a coating of the cashew nut shell oil compound while retaining substantially its heat resistant qualities and flexibility and is more resistant to heat and more flexible than a coating of said synthetic drying oil while retaining to a great degree the same solvent resistant qualities as said synthetic drying oil.

20. A coating composition comprising cooked cashew nut shell oil treated with formaldehyde admixed with a synthetic drying oil comprising a polymerization product of divinyl acetylene combined in such proportion that a dried coating of the composition is more resistant to solvents than a coating of the cashew nut shell oil compound while retaining substantially its heat resistant qualities and flexibility and is more resistant to heat and more flexible than a coating of said synthetic drying oil while retaining to a great degree the same solvent resistant qualities as said synthetic drying oil.

21. A coating composition comprising cooked cashew nut shell oil admixed with a synthetic drying oil comprising a polymerization product of divinyl acetylene and admixed with a varnish resin to supply adhesive quality, said cashew nut shell oil compound and said synthetic drying oil being combined in such proportion that a dried coating of the composition is more resistant to solvents than a coating of the cooked cashew nut shell oil compound while retaining substantially its heat resistant qualities and flexibility and is more resistant to heat and more flexible than a coating of said synthetic drying oil while retaining to a great degree the same solvent resistant qualities as said synthetic drying oil.

22. A coating composition comprising cooked cashew nut shell oil admixed with a synthetic drying oil comprising a polymerization product of divinyl acetylene combined in such proportion that a dried coating of the composition is more resistant to solvents than a coating of the cashew nut shell oil compound while retaining substantially its heat resistant qualities and flexibility and is more resistant to heat and more flexible than a coating of said synthetic drying oil while retaining to a great degree the same solvent resistant qualities as said synthetic drying oil.

23. An article of manufacture having thereon a coating comprising cooked cashew nut shell oil and a synthetic drying oil comprising a polymerization product of a divinyl acetylene.

LEWIS EDGAR MUNZ.